(12) United States Patent
Rice et al.

(10) Patent No.: US 6,227,035 B1
(45) Date of Patent: May 8, 2001

(54) GAS MODULE ORIFICE AUTOMATED TEST FIXTURE

(75) Inventors: Gregory D. Rice, Colorado Springs, CO (US); Peter K. Shogren, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 0 days.

(21) Appl. No.: 09/522,639

(22) Filed: Mar. 10, 2000

Related U.S. Application Data

(62) Division of application No. 09/306,053, filed on May 6, 1999.

(51) Int. Cl.[7] .................................................. G01M 19/00
(52) U.S. Cl. ............................................................ 73/37.9
(58) Field of Search ........................... 73/1.72, 168, 37.5, 73/37.9

(56) References Cited

U.S. PATENT DOCUMENTS

| | | | |
|---|---|---|---|
| 4,527,415 | 7/1985 | Chabat-Courrede | 73/4 R |
| 4,574,617 | * 3/1986 | Hetznecker et al. | 73/37.9 |
| 4,598,579 | 7/1986 | Cummings et al. | 73/37 |

* cited by examiner

Primary Examiner—Robert Raevis
(74) Attorney, Agent, or Firm—Christopher Allenby, Esq.

(57) ABSTRACT

A test fixture for a laser gas module offers automatic and manual testing for individual gas module components. Check or pressure relief valves are tested with an increasing pressure ramp caused by a metered gas flow into a ballast tank. Metering orifices are tested by measuring pressure change in a known volume tank as gas to or from the tank is directed through the orifice under test. The fixture includes capability to test valve logic and leakages. Test sequence and results are monitored on a computer display showing a schematic representation of both module and fixture. Manual control of module and fixture components is done via a computer graphic interface.

8 Claims, 8 Drawing Sheets

GAS MODULE ORIFICE AUTOMATED TEST FIXTURE

RELATED APPLICATION

This application is a divisional application of U.S. patent application Ser. No. 09/306,053, filed May 6, 1999, entitled "Gas Module Valve Automated Test Fixture."

FIELD OF INVENTION

The invention relates to test equipment for a gas module, and more specifically the invention relates to test equipment for gas supply systems in gas discharge lasers.

BACKGROUND

Gas discharge lasers, such as excimer lasers, are used in industrial applications. These applications include use in stepper systems for ultra large scale integrated circuit manufacturing. In such industrial applications it is extremely important to precisely control laser beam pulse energy and wavelength in order to ensure consistent processing quality for each wafer. Laser beam quality is critically dependent on accurate and precise control of gas mixture and pressure in the laser discharge chamber.

FIG. 1 shows an excimer laser system used as a stepper system illumination source. Gas control unit (or gas module) 101 in laser system 102 is subject to testing by the present invention. Laser system 102 produces laser output beam L used by stepper 103. Stepper control unit 104 uses a signal to trigger laser control unit 105 to generate a laser pulse. Laser control unit 105 then signals power source 106 to provide a controlled voltage pulse to lasing unit 107. Lasing unit 107 comprises a laser chamber, optical resonator, and other conventional laser beam generation components. Lasing unit 107 sends signals to laser control unit 105 that indicate the status of lasing unit 107 components and gas mixtures.

The laser chamber in lasing unit 107 is filled with a laser gas having a precise pressure and mixture. Gas mixtures are typically krypton-fluorine or other conventional rare gas/halide laser gas mixtures. Control circuits excite the laser gas mixture by applying a voltage discharge pulse of predetermined width and interval across electrodes (not shown). The voltage discharge pulse excites an oscillation in the resonating chamber and thereby creates a laser beam.

Gas control unit 101 helps to ensure constant laser beam energy and bandwidth by replacing laser chamber gases consumed during laser beam generation. Gas control unit 101 receives control signals from control unit 105 to supply the proper gas mixture and pressure to lasing unit 107. Laser control unit 105 receives signals from gas control unit 101 indicating operating status and gas pressures in gas control unit 101. Gas control unit 101 must limit mass flow rates and control the mixture ratio of gases supplied to the laser chamber. In addition, gas control unit 101 must provide a capability for handling dangerous gases, such as fluorine, typically used in gas discharge lasers. And, gas control unit 101 must provide for gas evacuation from the laser beam generation equipment in lasing unit 107 under both normal and emergency conditions.

To Applicants' knowledge, no procedures or equipment were developed to characterize and test the critical gas control unit 101 prior to the present invention. In addition, no single piece of test equipment existed that was capable of performing a comprehensive test of a gas module such as gas control unit 101.

The challenge, therefore, was to create a test fixture and evaluation methods capable of ensuring proper gas control unit function during production operations using the laser beam. A further challenge was to create a test fixture and evaluation methods that allow gas module tests and measurement for use during engineering development.

SUMMARY

One embodiment of the present invention provides apparatus and methods for testing a gas discharge laser gas control module. Testing may be accomplished in accordance with the present invention by using a single test fixture. A test operator may test a gas module using automatic or manual functions, or a combination of both. Functional tests include evaluating gas control module leakage, valve logic, electrical wiring and connections, valve operation, pump operation, and metering orifice diameters. Test data are acquired, stored, manipulated, and displayed to produce information useful during both production and engineering development.

Gas module leakage may be tested by pressurizing gas module components using nitrogen gas and monitoring for pressure drops. Additional leak tests may be accomplished in embodiments having a built-in helium detector for use in conventional helium leak testing.

Valve logic and electrical circuit tests ensure a given control signal activates the proper valve. A pressurized gas may be applied to a closed valve. When a control signal is applied to open the valve, either directly as in a solenoid valve or indirectly as in a pneumatically actuated valve, gas pressure is monitored to check proper valve function.

Check valves and pressure relief valves may be tested both for leakage (reverse flow pressure test) and for correct opening pressure (forward flow pressure test). Opening pressure may be checked by applying an increasing pressure ramp to the valve under test and monitoring the pressure difference between upstream and downstream pressure readings of gas flow through the valve. The increasing pressure ramp may be supplied using a controlled gas fill rate into a ballast tank.

Orifice diameter testing may be done by monitoring either the gas fill or discharge rate of a gas container through the orifice under test. Gas pressures above and below the orifice under test may be monitored and compared to known calibration readings. From this pressure information a computing system may calculate an accurate average diameter of the orifice under test.

Information such as analog output signals from pressure transducers may be sampled and stored in a test fixture memory storage area. This information may be used to calculate test results that are subsequently displayed in graphic format.

Test fixture control may be accomplished through a computer graphical user interface. In some embodiments, a schematic of the gas control module and the test fixture is displayed. These embodiments may include capability for operating both gas module and test fixture components using the graphic interface. An operator may monitor automatic test sequences by viewing the display as well. Test fixture operation may be accomplished using a computer control system that controls the gas-related plumbing and monitors data collection devices with electronic interfaces.

DETAILED DESCRIPTION

In order to describe test fixtures and methods in accordance with the present invention, we first explain a specific representative gas module. Following this explanation, we continue the detailed description and explain how we test specific representative gas module components. Those skilled in the art will understand, however, that many embodiments may exist within the present invention's spirit and scope as described for specific embodiments below. Embodiments of this invention are not limited to testing the specific gas module shown here.

The terms sensor and transducer are used interchangeably throughout the detailed description. Furthermore, references to actions by a test operator may refer either to manual or automatically controlled operation.

I. Gas Module Description

Figure 2:
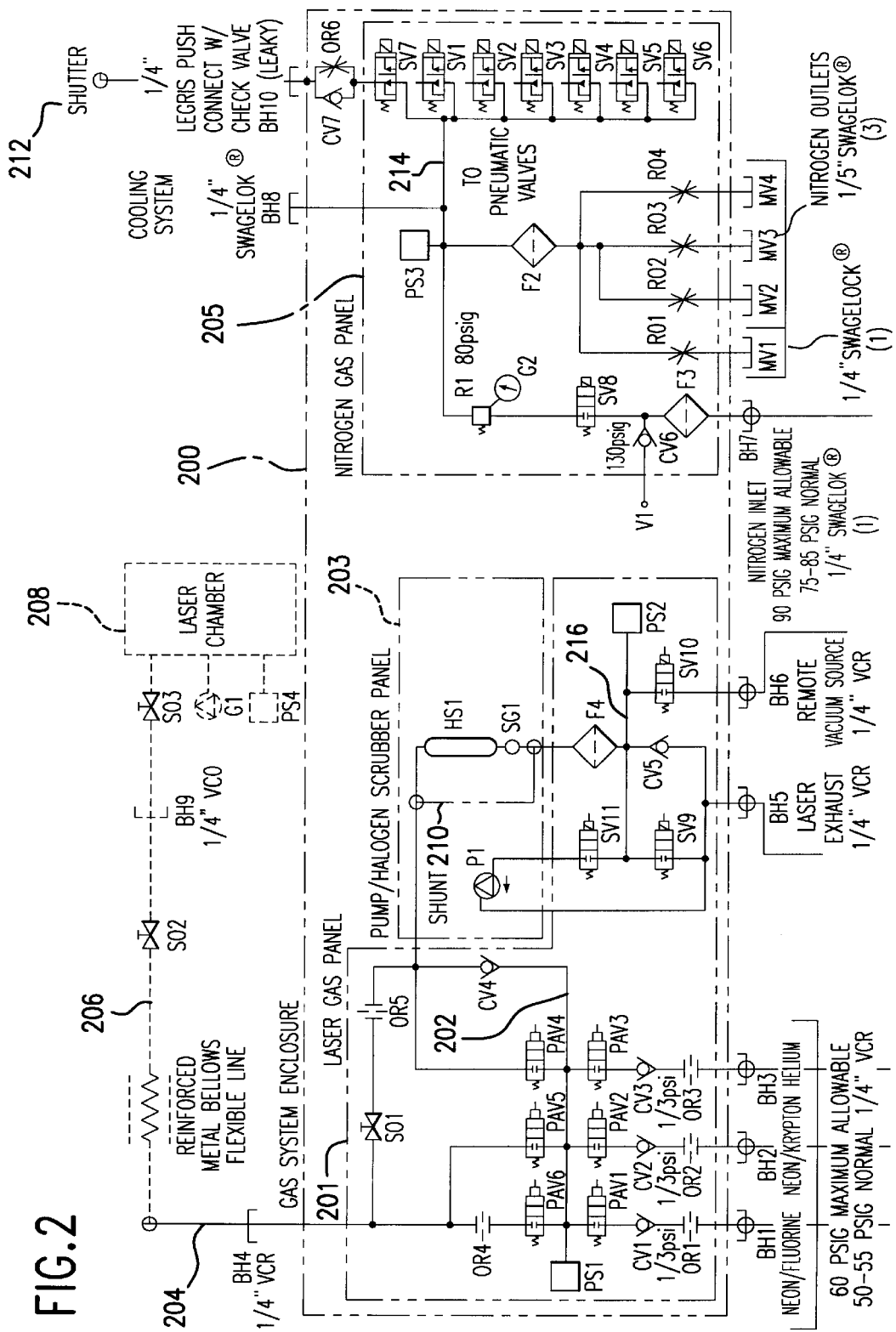
FIG. 2 is a schematic representation of a gas module.

FIG. 2 is a schematic representation of a typical gas module 200. The module contains laser gas panel 201, pump/halogen scrubber panel 203, and nitrogen panel 205. The solid lines represent pipes or tubes capable of carrying a gas flow. In addition, FIG. 2 uses the following functional symbols for gas module 200 components:

BH: Bulkhead Gas Fitting

CV: Check Valve

F: Filter

G: Pressure Gauge

HS: Halogen Scrubber

MV: The Output Coupling on a Conventional Rotameter.

OR: Orifice or Adjustable Needle Valve

P: Pump

PAV: Pneumatic Actuated Valve. In this representation, a PAV is actuated by pressurized dried nitrogen supplied through a solenoid valve.

Figure 1:
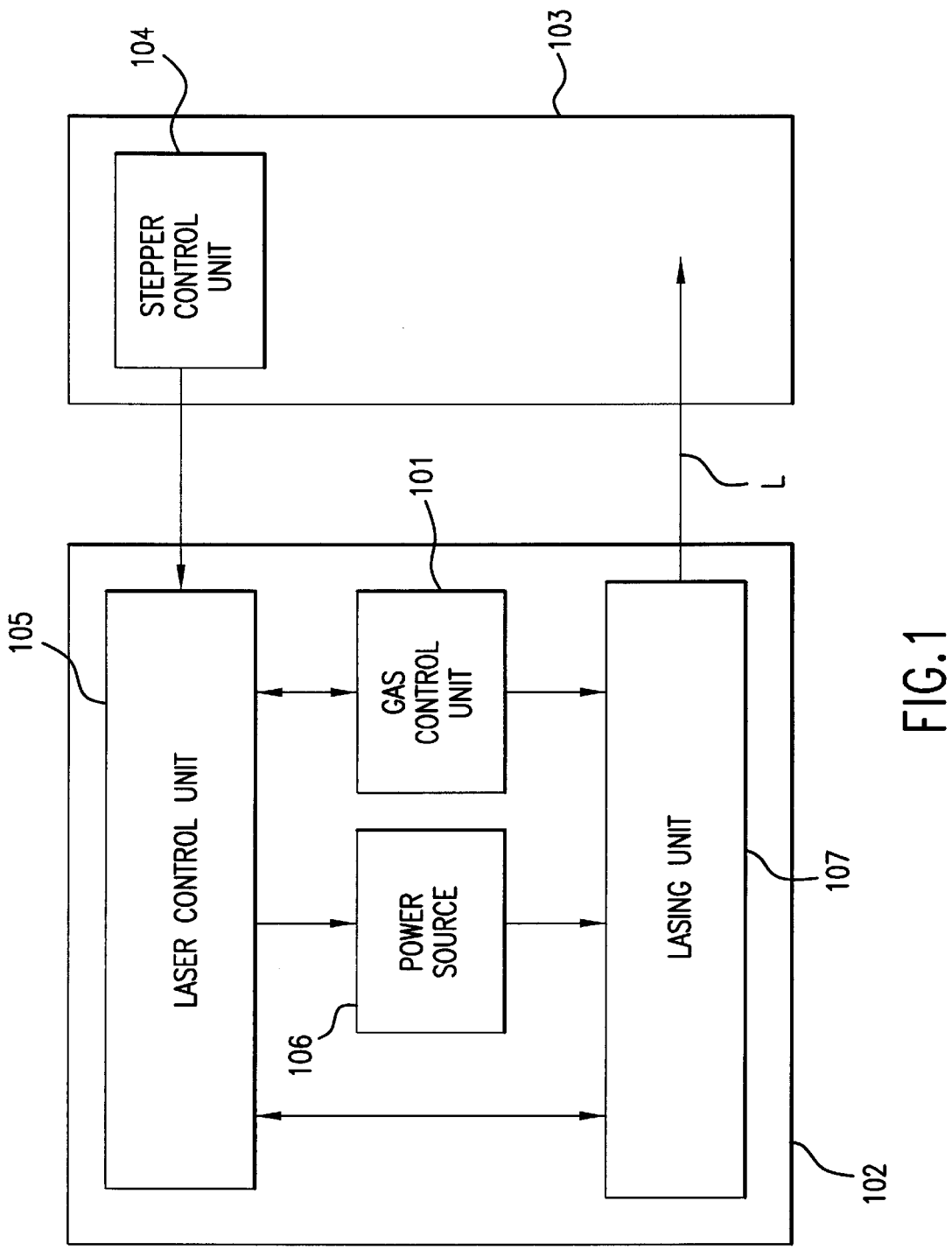
FIG. 1 is a block diagram showing an excimer laser system used as a stepper system illumination source, with the laser system having a gas control unit subject to test using the present invention.

PS: Pressure Sensor. These are gas pressure transducers that produce an analog output electrical signal. The PS analog output signals are typically used by laser control module 102 (FIG. 1), and during testing procedures for data acquisition.

R: Manual pressure regulator

RO: Rotameter. Name for a mechanical device used to set and measure gas flow. A rotameter is a gauge in which a ball is suspended by a gas flowing upward in a conical bore so that the ball's height indicates gas flow volume.

SG: A gauge not used in relation to this invention.

SO: Shut Off valve

SV: Solenoid valve. Electrically actuated valve controlling gas flow to a Pneumatic Actuated Valve or other component.

V: Vent fitting.

In addition, FIG. 2 shows part of the laser system itself, represented by "Reinforced Metal Bellows Flexible Line", SO2, BH9, SO3, G1, PS4, Laser Chamber 208, "Cooling System", and laser shutter 212. These components are not gas module 200 components, but are included to show gas module 200's relation to the laser system components that use the supplied gas mixture.

Within gas module 200, nitrogen panel 205 provides controlled, pressure regulated nitrogen gas for various uses. Gas module 200 uses nitrogen gas to control laser gas panel 201 pneumatic activated valves (PAVs). The laser generating system 101 (FIG. 1) uses nitrogen for cooling and to activate laser shutter 212. In addition, a user may require nitrogen gas for other applications.

Nitrogen gas enters nitrogen panel 205 through fitting BH7 and filter F3. Check valve CV6 provides overpressure protection, allowing high pressure gas to vent through fitting V1. Valve SV8 controls nitrogen gas flow to manifold 214. Regulator R1 is manually activated and gauge G2 indicates regulator R1 gas pressure setting. Sensor PS3 measures nitrogen gas pressure in manifold 214.

Nitrogen panel 205 allows pressure regulated nitrogen gas to be directed in several ways after reaching manifold 214. First, nitrogen gas is available to solenoid valves SV1–SVG6 for use in activating pneumatic actuated valves PAV1–PAV6, respectively, in laser gas panel 201. When an opening signal is applied to a solenoid valve, nitrogen gas flows from manifold 214 through the open solenoid valve and is carried via a pipe or tube (not shown) to the corresponding PAV. When the PAV receives sufficient gas pressure, it opens. Second, nitrogen gas from manifold 214 is available to control gas-activated laser shutter 212. Nitrogen gas is directed to shutter 212 through solenoid valve SV7, orifice OR6, and fitting BH10. Opening and closing signals to valve SV7 control nitrogen gas flow for shutter 212 activation. Manually operated orifice OR6 protects shutter 212's operating mechanism (not shown) by limiting gas flow. Valve CV7 is not essential to operation. It is a component of the standard LEGRIS fitting selected for bulkhead mounting. The LEGRIS fitting, known to those skilled in the art, provides a push-in connection for a plastic tube, as well as the needle valve, in a compact and economical package. CV7 is tested to verify it does not defeat the fitting's needle valve metering operation. Third, nitrogen gas from manifold 214 is available to a laser cooling system (not shown) through fitting BH8. Finally, nitrogen gas from manifold 214 is available for other discretionary uses via filter F2, rotameters RO1–RO4, and fittings MV1–MV4.

Laser gas panel 201 receives premixed gases, combines them into a single gas mixture having a precise ratio and pressure, and provides them to the laser system chamber 208. The gas mixtures and pressure is typically controlled by a laser control unit (102, FIG. 1). As depicted, three premixed gases enter laser gas panel 201 through fittings BH1, BH2, and BH3. Neon/fluorine gas enters through BH1, neon/krypton gas through BH2, and helium gas through BH3. BH1–3 are standard ¼-inch faceseal fittings, such as VCR fittings supplied by the Cajon Co. These are screw-on fittings using a nickel gasket as a seal. Nickel is chosen in order to eliminate any organic materials and because it is more corrosion resistant to strong oxidizing gases such as fluorine.

The three gases flow through fittings BH1, BH2, and BH3 to orifices OR1, OR2, and OR3, respectively. The orifices OR1, OR2, and OR3 are 0.063 inch diameter round orifices. Their function is to limit the premixed gas input mass flows. Next, the three gasses flow through check valves CV1, CV2, and CV3 to valves PAV1, PAV2, and PAV3, respectively. Valves CV1, CV2, and CV3 are typically high flow, ball-type, one-third (⅓) pound per square inch (psi) pressure-actuated one-way valves. Their purpose is to prevent gas mixture back-flush out of manifold 202.

Electrically actuated solenoid valves SV1–6 drive pneumatically-activated valves PAV1–6 using nitrogen as discussed above (connection not shown). PAV1–PAV3 control individual premixed gas flow into manifold 202. After the gasses pass through valves PAV1, PAV2, and PAV3 they become mixed in manifold 202. An external controller (not shown) optoelectrically monitors gas concentration levels in laser chamber 208, and subsequently activates valves PAV1, PAV2, and PAV3 to produce a desired laser chamber 208 gas mixture ratio. Sensor PS1 measures manifold 202 gas mixture pressure and produces a signal indicating sensed pressure. Sensor PS1 and sensor PS2 described below are selected to withstand gas pressures significantly below one atmosphere, although readings at such low pressures may be inaccurate.

As shown, laser gas panel 201 provides a laser gas mixture to a laser system running on neon/fluorine and neon/krypton gas mixtures. Fluorine is consumed during laser operation, so a laser control unit must make small incremental adjustments to the fluorine/krypton gas mixture to ensure a constant mixture ratio. From manifold 202, the gas mixture is routed to line 204 and then to chamber 208 through valves PAV5 and PAV6. Valve PAV5 provides a way to fill laser chamber 208 quickly, for example on initial start-up. PAV6 provides a way to let in small fluorine and krypton gas mixture adjustment levels. Orifice OR4 controls this small adjustment flow, and has a 0.013-inch diameter. A regulating orifice is used because the pneumatically-actuated valves are on-off, not proportional valves. Thus a laser control unit (102, FIG. 1) obtains a better gas mixture resolution by using a flow restricting orifice. The laser control unit typically directs the gas module to use small, incremental gas mixture puffs, supplied by quickly opening and closing a pneumatic valve, to control gas mixture and pressure in a laser chamber.

In order for the laser system control unit (102, FIG. 1) to ensure laser chamber 208 receives a proper gas mixture, accurate gas module 200 orifice diameters are critical. When the orifice diameters are off specification, laser control unit 102 (FIG. 1) has great difficulty determining what gas mixture adjustments to make. Thus orifices OR1, OR2, OR3, and especially OR4 (the fine control) must meet strict tolerances.

Investigation revealed that both laser perforated and mechanically drilled orifice diameters vary a great deal. In addition, investigation found that an orifice may become cone shaped if the nickel plate in which the orifice is drilled is overcompressed. That is, overtightening may dramatically change the orifice cross section. This cross section deformation is caused by the way a conventional faceseal fitting is made. Although this deformation is an important limitation for 0.063 inch orifices, it is especially critical for 0.013 inch orifices. Investigation found a 50–60 percent variation in actual average diameters for the 0.013 inch orifices.

Valve PAV4, either alone or in combination with valve PAV5, provides a way to bleed pressure off the system through pump/halogen panel 203. Check valve CV4 is rated at approximately 20 psi (or 1–2 atmospheres) and provides overpressure protection for manifold 202 and laser components (not shown) in chamber 208.

Valve SO1 is an emergency manual dump valve that is a safety feature. In the event the laser loses power, valve SO1 provides a way to quickly bleed off fluorine from laser chamber 208 through pump/halogen scrubber panel 203. Using valve SO1 guarantees that no fluorine remains in the system in case of a leak or if a technician subsequently opens the plumbing at any point. Even small amounts of fluorine combined with any water will create highly corrosive hydrofluoric acid. If an operator opens valve SO1, pressure dumps through orifice OR5. Orifice OR5 has a 0.063 inch diameter to prevent large impulse flows, thereby protecting the optics in chamber 208 (not shown) and the halogen scrubber HS1.

Pump/halogen scrubber panel 203 includes a pump P1 and a scrubber HS1. Pump P1 is a vacuum pump. Scrubber HS1 is a fluorine removal canister. When laser chamber 208 is cleaned, pump P1 pumps chamber 208 to a low pressure in the range of hundreds of millitorr. Scrubber HS1 provides a way to ensure that all system portions may safely vent fluorine. Note that shunt 210 is not in place during normal operation. Shunt 210 is inserted only during certain system test operations, such as nitrogen tests, described below.

Pump/halogen scrubber panel 203 also contains solenoid valves SV9, SV10, and SV11. Valve SV9 allows gas flowing through scrubber HS1 to vent to fitting BH5 under its own pressure. Valve SV11 allows gas flowing through scrubber HS1 to be pumped to fitting BH5 via pump P1. Valve SV10 allows gas flowing through scrubber HS1 to be pumped using a remote vacuum source connected to fitting BH6. Filter F4 is a filter preventing back flow contamination. Sensor PS2 is a pressure transducer.

II. Test Fixture Description

Both physical embodiments and test procedures in accordance with the present invention are now described. The following description first addresses check valve and orifice testing. Then, additional test fixture components and testing procedures are described. Throughout the accompanying figures, solid lines connecting components represent pipes or tubes capable of carrying a gas flow. Embodiments of the invention as described below were constructed with off-the-shelf components and using industry standard fabrication methods.

A. General Check Valve Test Description

Figure 3A:
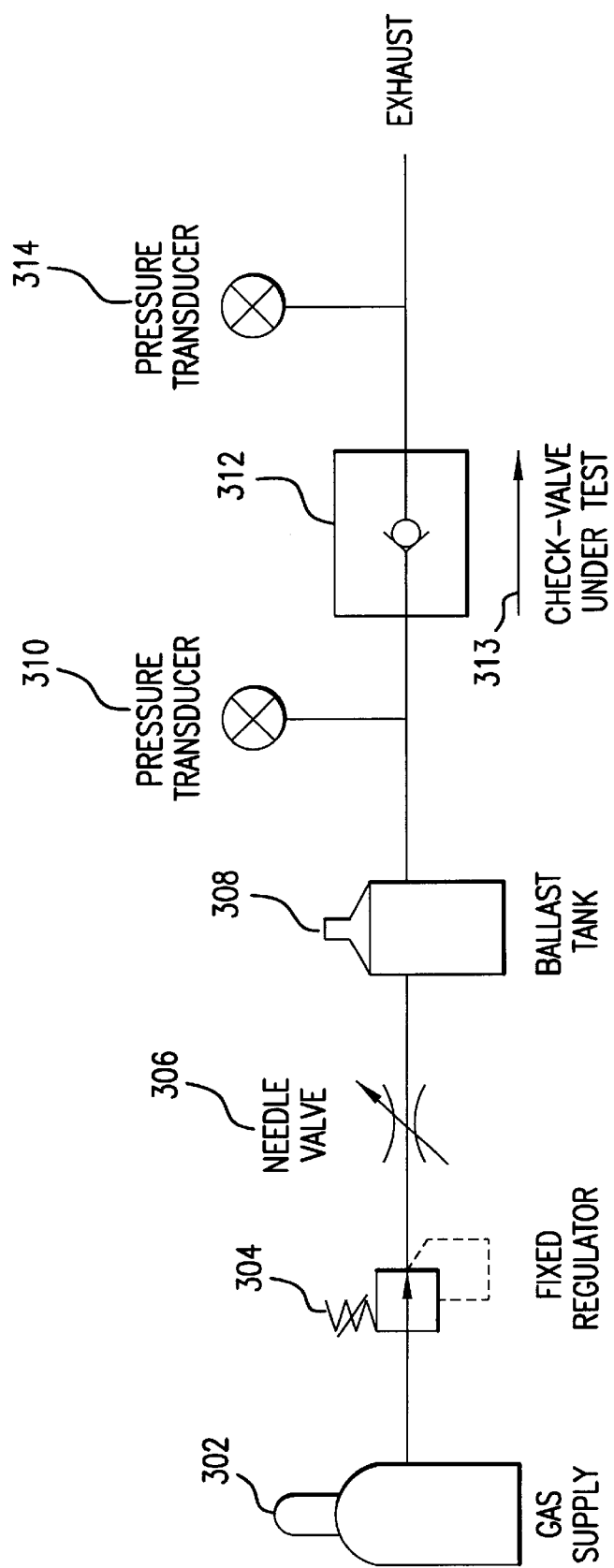
FIG. 3A is a component diagram showing an embodiment of the present invention used for check valve and pressure relief valve testing.

FIG. 3A is a diagram showing an embodiment of the present invention used to test check valve opening pressures. The embodiment shown creates a steadily increasing gas pressure ramp against a check valve under test. This pressure ramp is required because a test operator must determine check valve opening pressures as exactly as possible, but data acquisition sampling occurs at a finite rate.

As depicted, gas supply 302 provides a pressurized gas through pressure regulator 304 to needle valve 306. In this embodiment, needle valve 306 acts as an orifice and is adjusted to provide a small gas flow to ballast tank 308. In other embodiments, any suitable orifice, such as a valve, may be used. Ballast tank 308 is sized, and needle valve 306 is adjusted, to provide a steadily increasing pressure ramp in ballast tank 308 at a rate compatible with a desired data sampling rate. Pressure transducer 310, located upstream of the gas flow to check valve 312 under test, monitors increasing ballast tank 308 pressure. Pressure transducer 314 measures the pressure in the gas flow downstream from check valve 312. In some embodiments, transducers 310 and 314 produce an analog electric signal corresponding to sensed pressures. In other embodiments, transducers 310 and 314 may produce other output such as digital electronic signals or mechanical linkage movements. In embodiments producing analog electronic signals from transducers 310 and 314, the signals are sampled and recorded by a data acquisition system described in more detail below. Check valve 312 under test is typically a spring-operated valve designed to allow a gas to flow in a forward direction only, as represented by arrow 313. Spring tension is set in valve 312 so that the valve allows gas flow when upstream pressure exceeds the force holding the valve element in place from spring tension.

A calculating system, described in more detail below, may determine opening pressure by receiving pressure information from transducers 310 and 314 via a data acquisition system, described in more detail below. In some embodiments, the calculating system may be a programmed computer. In other embodiments, the calculating system may be a dedicated electronic circuit or a mechanical calculating apparatus. In some embodiments, data acquisition may be performed using interface circuits capable of transforming analog transducer signals to digital form for use by a computer. In other embodiments data acquisition systems may produce human-readable outputs such as printouts or graphs. In many embodiments not producing a direct opening pressure indication, a memory system, described in more detail below, exists that is capable of storing information from the data acquisition system for use by the calculating system. Memory systems may include electronic or magnetic storage, or human-readable printouts. The calculating system may calculate the valve under test 312's opening pressure by finding the pressure difference between signals from transducers 310 and 314 once the downstream pressure starts to rise.

Figure 3B:
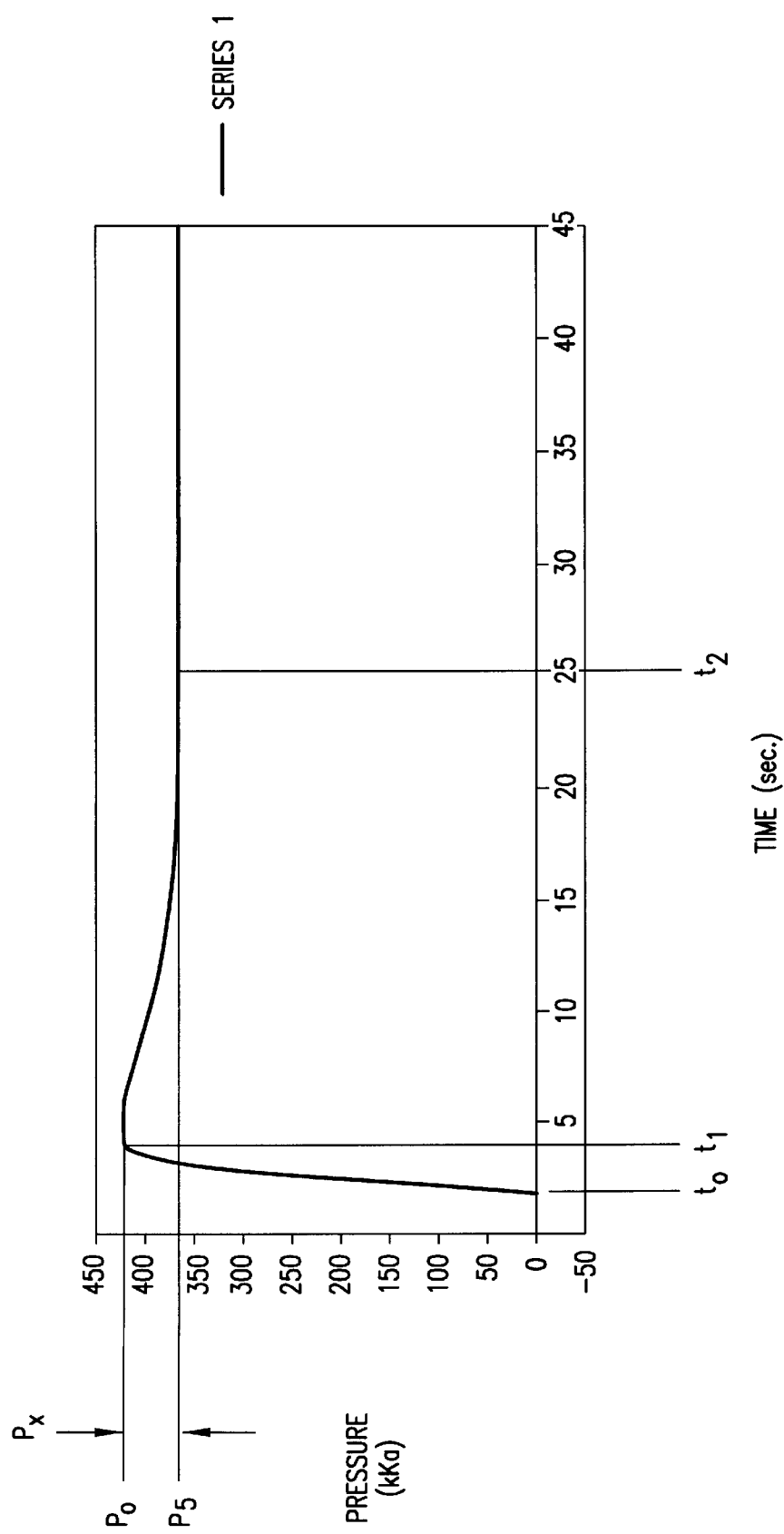
FIG. 3B is a representation of a check valve differential pressure display.

FIG. 3B shows an upstream/downstream differential pressure display plotting pressure versus time. In some embodiments pressure is displayed in kilopascals (kPa). In other embodiments the test fixture software is configured to display and store data in the natively rated pressure units of selected devices. Manual regulators and check valves, for example, may be rated in pounds per square inch absolute (psia) or gauge (psig). Time units used are seconds.

Both check and over-pressure valves may exhibit an anomaly in their flow characteristics when first opened after being closed for a long time (i.e., they tend to stick closed). This anomaly may be observed as an "overshoot" pressure that exceeds the specification opening pressure set by the internal closing spring. FIG. 3B shows a graphical display of a pressure overshoot $P_x$, calculated and displayed using pressure information from transducers 310 and 314 located upstream and downstream of a check valve under test 312 as shown in FIG. 3A. The displayed pressure $P_s$ represents the valve 312 opening pressure during a steady gas flow at time $t_2$ after initial opening at time $t_1$.

Thus, referring again to FIG. 3A, if check valve 312 sticks closed, transducer 310 monitors the upstream pressure rising above the valve 312 specification opening pressure. When the valve opens, however, transducers 310 and 314 monitor the upstream/downstream pressure differential as the pressure differential drops to the specified minimum pressure. In some embodiments, if the flow below the valve under test 312 vents to the outside environment, pressure transducer 314 data may be omitted and outside pressure information used instead.

B. General Orifice Test Description

Figure 4:
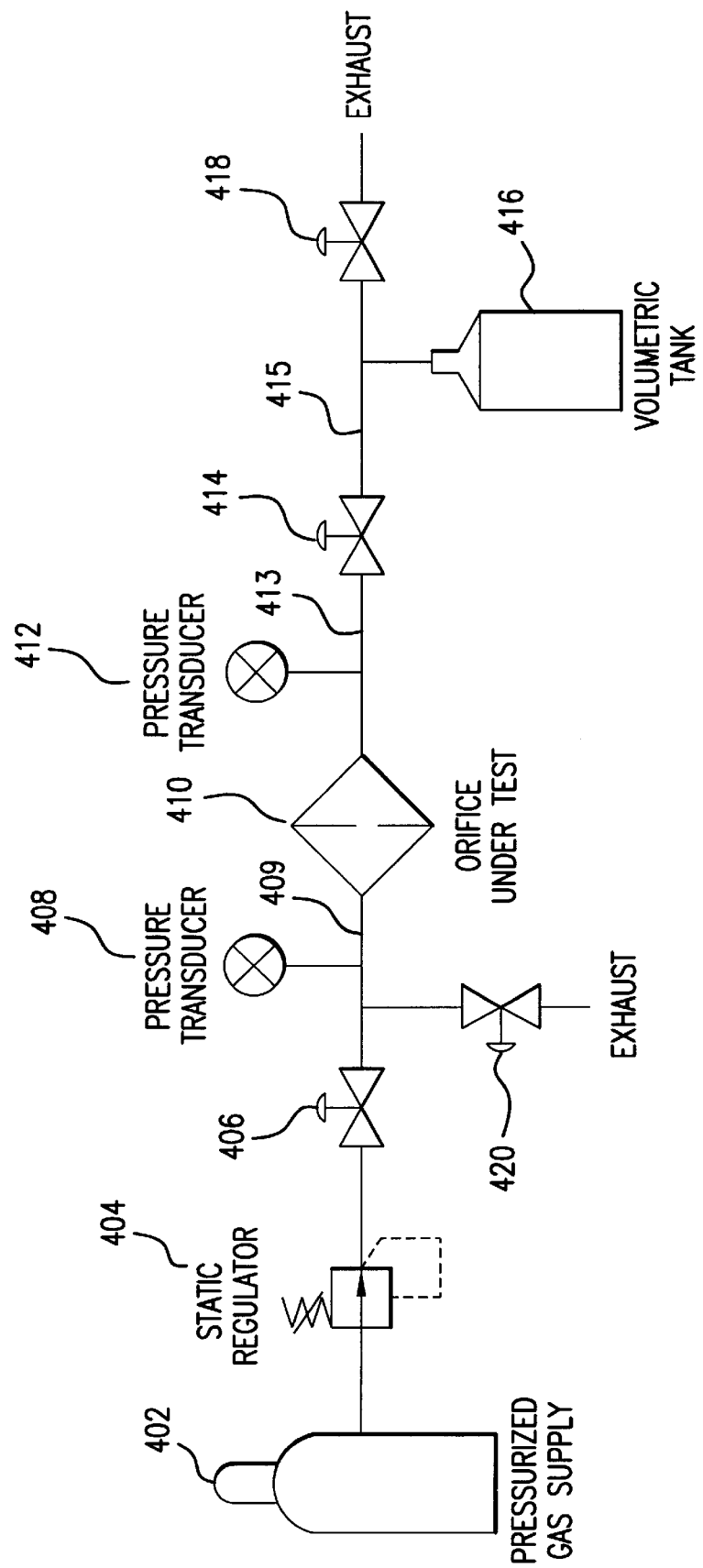
FIG. 4 is a diagram showing an embodiment of the present invention used for orifice diameter testing.

FIG. 4 is a diagram showing an embodiment of the present invention used to test orifice diameter size. Such orifices may be used to restrict gas flows as described above in the gas module (200, FIG. 2) description. As shown, orifice 410 is the orifice under test.

A gas source 402 supplies a pressurized gas flow via pressure regulator 404 and valve 406 to orifice 410. In some embodiments, regulator 404 may be manually operated. In other embodiments, a remote control device such as a programmed computer may operate regulator 404. Valve 420 provides a means to allow gas in line 409 to vent to the outside environment. Below orifice 410, gas flows between lines 413 and 415 through valve 414. Valve 418 provides a means to allow gas in line 415 to vent to the outside environment. In the embodiment shown, valves are either fully open or fully closed, having no intermediate positions. In some embodiments, valves 406, 414, 418, and 420 may be manually operated. In other embodiments these valves may be operated using a remotely controlled force such as that generated by an electrical signal or gas pressure. Still other embodiments may use a combination of manual and remotely controlled valves.

Pressure transducer 408 measures gas pressure on one side of orifice 410, and pressure transducer 412 measures gas pressure on the opposite side of orifice 410. In some embodiments, transducers 408 and 412 each produce an analog electrical signal corresponding to the measured pressure. In other embodiments, transducers may use other ways of indicating a sensed pressure, such as a digital electronic signal, a mechanical link, or a readable display.

Tank 416 is capable of receiving and holding pressurized gas. Tank 416 volume is precisely determined, as is the volume of the additional plumbing connecting individual components, using measurement or calculation. Furthermore, typical system gas flow restrictions, such as those for valves 406 and 414, are conventionally known. Thus, a calculating system (not shown) may calculate tank 416 pressure using conventional calculations, pressure transducer 412 measurement signals, known system volume and flow restrictions, known environmental conditions, and known gas laws. Embodiments may include a data acquisition system, a calculating system, and a memory similar to that described above under "General Valve Test Description" and described in more detail below.

A test operator may begin orifice 410 diameter testing by setting initial conditions. The operator first closes valves 406, 414, 418, and 420. The operator then opens valve 418 to set tank 416 internal pressure to the outside environment pressure. Once tank 416 pressure is stable, the operator closes valve 418. The operator then opens valve 414 and monitors transducers 408 and 412 output signals.

To perform a test, the test operator opens valve 406. A gas flow at a pressure regulated by regulator 404 flows through valve 406, through orifice 410, through valve 414, and begins to fill tank 416. Tank 416 fill time will be inversely proportional to orifice 410 average diameter. Faster tank 416 fill rates result from larger orifice 410 average diameters. Transducer 412 senses the increasing tank 416 pressure, and a data acquisition system and memory unit record pressure over time. Then using Boyle's and Charles's Laws, and referring to calibration data using a known orifice diameter as described in detail below, a calculating system may determine the actual average diameter of orifice 410 using conventional calculations.

Another embodiment of the test procedure reverses the gas flow direction through the orifice under test. Still referring to FIG. 4, a test operator first closes all valves. The operator then opens valves 406 and 414 to allow gas from supply 402 to fill tank 416 until reaching a pressure set by regulator 404. The operator then closes valve 406 and monitors transducer 412. To begin a test, the operator opens valve 420 and monitors the transducer 412 pressure output signal as pressurized gas in tank 416 drains through valve 414, orifice 410, and valve 420. Using information showing tank 416 pressure drain rate system volume and flow restrictions, environment conditions, and gas laws, an operator may calculate orifice 410's actual average diameter.

The most difficult problem is initial test apparatus calibration because an orifice of known size must be used to determine a reference pressure rise or fall rate for gas in tank 416. For one embodiment, initial calibration was performed using a set of very precise custom made laser perforated orifices having diameters in two size ranges. The set in the small range included opening diameters from 0.004 inches through 0.023 inches in 0.001 inch increments. The set in the large range included opening diameters from 0.050 inches to 0.075 inches, also in 0.001 inch increments. The most precise orifices for each particular size increment were selected from several nominal production attempts using optical microscope measurements.

At least two selected orifices for each particular size were then tested using a test fixture embodiment. Test data were gathered and acquisition errors smoothed using a standard digital filter algorithm known to those skilled in the art. Calibration tables and graphs were then generated using this data to give a statistical flow rate representation. The tables and graphs included positive and negative flow rate limits for use in test fixture software. Once pressure change rate calibration is accomplished, however, tests indicate that the method described above is sufficiently consistent to detect an improperly sized orifice. The manual calibration testing and analysis described above indicated that variations in the effective diameter of orifice OR4, a 0.013 inch orifice, could be resolved to under 0.0004 inches. Variation in the effective diameters of 0.063 inch orifices could be resolved to approximately 0.001 inch.

C. Test Fixture Description

For the embodiment described, tubing used was one-quarter (¼) inch stainless steel with a five (5) microinch (μin.) internal finish. Connections made other than using conventional compression or faceseal fittings, such as SWAGELOK or VCR fittings, were typically done using standard orbital welding techniques. Such materials and fabrication methods are standard for constructing semiconductor industry gas handling equipment.

Figure 5A:
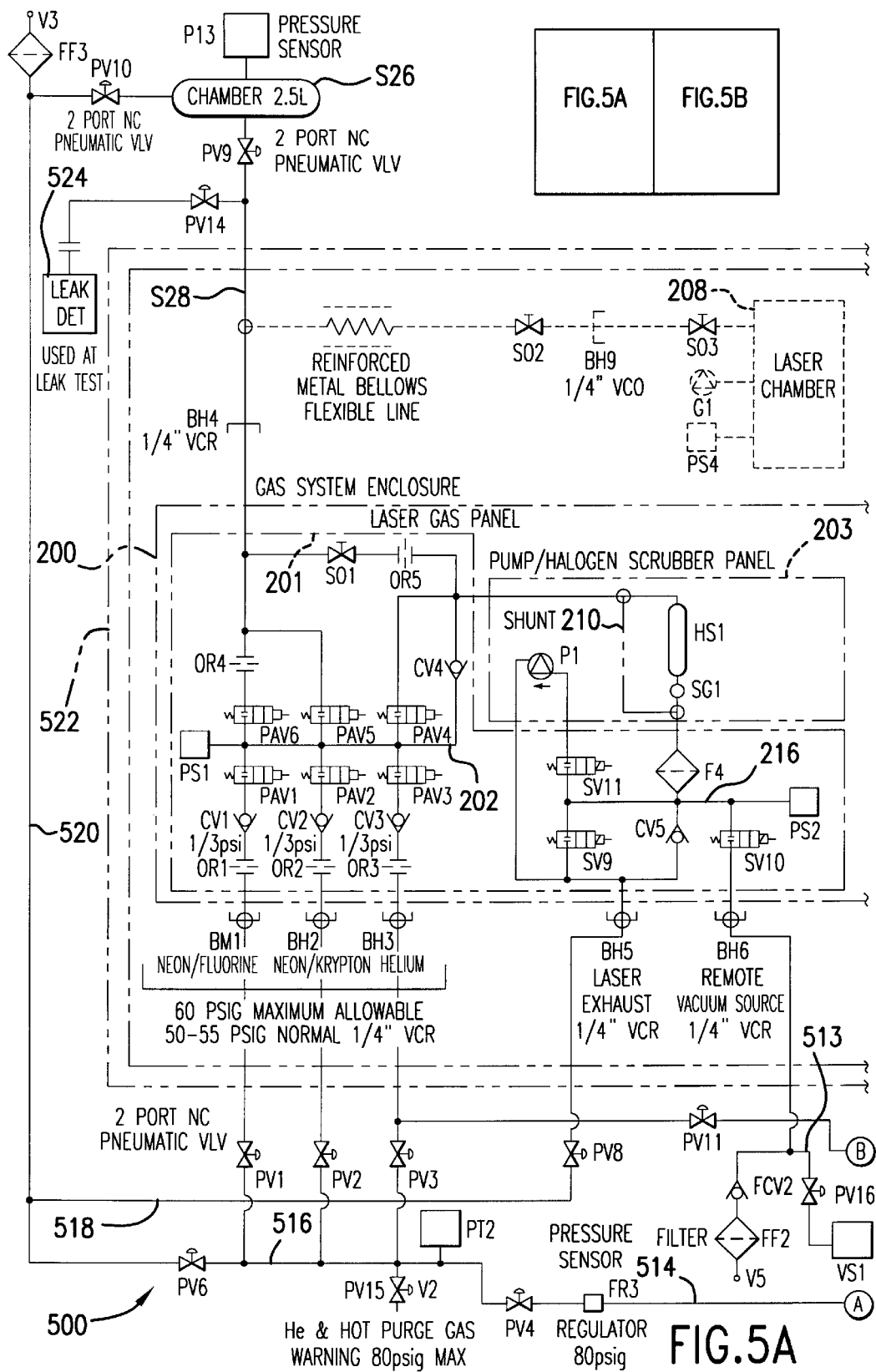
FIGS. 5A and 5B combined are a schematic showing an embodiment of the present invention.
Figure 5B:
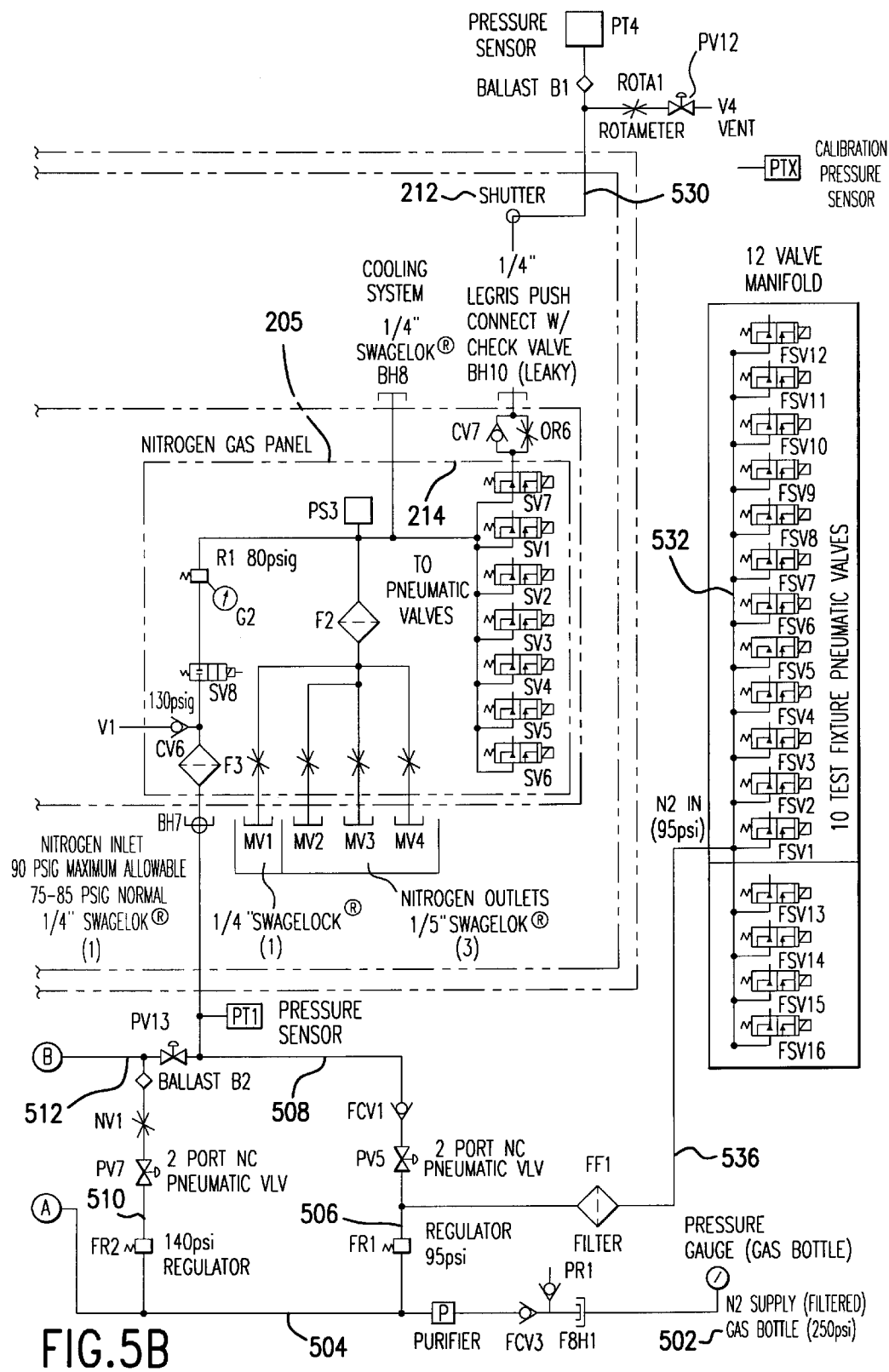

FIGS. 5A and 5B combined show an embodiment of a test fixture 500 configured in accordance with the present invention. Components shown within dotted line 200 correspond to gas module components to be tested, described above in relation to FIG. 2. Components outside double dotted line 522 comprise test fixture 500. In addition to the gas module 200 (FIG. 2) symbols used above, this description uses the following symbols:

B: Ballast. A chamber of known volume for holding pressurized gas.

FBH: (Fixture) Bulkhead Fitting

FCV: (Fixture) Check Valve

FF: (Fixture), Filter. Filters are selected to accommodate gas flow rates significantly greater than required for test fixture operation. This "overkill" accommodation ensures that test fixture operation and calibration are unaffected.

FR: (Fixture) Regulator. In the embodiment shown, regulators supplying gas pressure from 0–100 psi are TESCOM model 64-2662KRA20 (FR1 and FR3), and the regulator supplying gas pressure from 0–250 psi is TESCOM model 64-2663KRA20 (FR2).

FSV: (Fixture) Solenoid Valve

NV: Needle Valve

P: Purifier. In the embodiment shown, the purifier is an AERONEX model SS-500K-4R.

PR: Pressure Relief Valve

PT: Pressure Transducer. Equivalent to Pressure Sensors in the gas module. The embodiment shown may use either SPT model 203 or DATA INSTRUMENTS model SV26.

PV: Pneumatic Valve. Operated by supplying or removing a gas pressure.

VS: Vacuum Sensor. Equivalent to Pressure Sensors/Transducers, but for pressures less than approximately one atmosphere.

Referring to the lower right corner of FIG. 5B, pressurized nitrogen gas is supplied to test fixture 500 through fitting FBH1 from supply 502. A "Dewar" supply, known to those skilled in the art, may be used to avoid frequent supply bottle changes. Pressure relief valve PR1 provides blow-off protection in case of supplied gas overpressure. Valve PR1 is rated at approximately 300 psig. In some embodiments PR1 may be a high volume, high pressure check valve. In other embodiments PR1 may be a rupture valve. Check valve FCV3 prevents back-flow into nitrogen supply 502. Valve FCV3 is a high flow ball-type check valve with an opening pressure of approximately one-third (⅓) psi. Purifier P ensures that very pure nitrogen is used. In the embodiment shown, purifier P is an AERONEX model SS-500K-4R. Other embodiments may use other purifier units. Purifier unit specification is not critical as long as rated purifier flow rate is significantly greater than the test fixture's required flow as described above for test fixture filters. The embodiment shown uses nitrogen gas with at least 99.999 percent purity. This nitrogen purity level is used during normal laser system operation. Lesser purity nitrogen may leave water or hydrocarbon residue in the device under test. After passing through purifier P the nitrogen gas at 99.9999999 percent purity enters manifold 504 for distribution within test fixture 500.

As depicted, nitrogen gas from manifold 504 may be distributed throughout portions of test fixture 500 at three pressures. Regulators FR1, FR2, and FR3 regulate these three pressures. In one embodiment the regulators are set by opening appropriate test fixture valves and manually adjusting a regulator while observing a display of transducer PT1 and PT2 pressure readings. In the embodiment shown, regulator FR1 governs gas flowing to line 506 at 95 pounds-per-square-inch (psi), regulator FR2 governs gas flowing to line 510 at 140 psi,and regulator FR3 governs gas flowing to line 514 at 50 psi. Pressures of 75–95 psi are required to properly actuate the pneumatic valves. A 140 psi pressure is used to create a rising pressure ramp required to test the high pressure check valves. The 50 psi pressure simulates the actual operating pressure of laser system 101. From lines 506, 510, and 514, a test operator may distribute gas within test fixture 500 at the three regulated pressures by manipulating various valves, as described below.

As shown, regulator FR1 governed nitrogen gas from line 506 is routed through filter FF1 and through line 536 to valve manifold 532. Filter FF1 is a simple, off-the-shelf, sintered metal filter that is used to protect the solenoid valve seats from becoming contaminated with particulates. The filter specifications are not critical as long as the rated flow rate does not restrict test fixture operation. Solenoid valves FSV1–FSV16 are connected to manifold 532 so that when an individual solenoid valve receives an electronic activation signal, the valve opens and allows gas from manifold 532 to flow through a connecting line (not shown) to a corresponding pneumatically-actuated test fixture 500 valve. In the embodiment shown, connections between the solenoid and pneumatic valves are high-pressure plastic tubing and conventional push-on connectors. For example, solenoid valve FSV1 controls a gas flow that may actuate pneumatically-actuated valve PV1, and so on. Solenoid valves FSV1–FSV16 each receive a corresponding activation signal via an electronic connection (not shown) from a test fixture control unit (not shown), described below. A test operator may also direct pressurized gas in line 506 to flow to nitrogen panel 205 by opening valve PV5, and to flow to laser gas panel 201 by then opening valves PV13 and PV11. Note that up to 140 psi may be applied to fitting BH7 to test valve CV6, which is a 130 psi high pressure relief valve. Check valve FCV1 protects valves FSV1–16 from high gas pressure in line 508 in case valve PV5 fails or is inadvertently opened. Pressure sensor PT1 measures gas pressure in line 508 and produces a signal representing the sensed pressure.

A test operator may direct regulator FR2 governed gas from line 510 to gas module 200. Gas from line 510 flows through pneumatically-actuated valve PV7, needle valve NV1 and ballast B2 to line 512. Needle valve NV1 and ballast B2 provide a configuration for check valve and pressure valve testing as described above under "General Check Valve Test Description." In the embodiment shown, needle valve NV1 is a standard high purity stainless steel unit. It is manually adjusted to act in concert with ballast B2 to produce an increasing pressure ramp rate appropriate for the test time and data acquisition sampling rate. The range of flow rates controlled by valve NV1 is selected when the actual fixture volumes and data acquisition parameters are known. In some embodiments, ballast B2 is selected to have a volume of 50–100 milliliters. Any volume in this range is acceptable. A test operator may direct pressurized gas from line 512 to nitrogen panel 205 by opening valve PV13, and to laser gas panel 201 by opening valve PV11. Valve PV3 provides a way for gas from line 512 to enter manifold 516. Valves PV1 and PV2 provide a way for gas in manifold 516 to be directed to flow to fittings BH1 and BH2, respectively. Sensor PT2 measures the gas pressure in manifold 516 and produces a signal representing the sensed pressure.

A test operator may direct regulator FR3 governed gas to manifold 516 by opening valve PV4. From manifold 516, a test operator may direct a gas flow to laser panel 201 fittings BH1–BH3 by opening valves PV1–PV3, respectively. A test operator may also direct a pressure ramp, created by needle valve NV1 and ballast B2, to bulkhead fitting BH3 via valve PV11 and through valve PAV3 for the purpose of measuring the pressure response of check valve CV4.

Gas from manifold 516 may be dumped to the outside environment by opening valve PV6. Gas then flows through line 520 and filter FF3 to vent V1. Filter FF3 is similar to filter FF1, namely a conventional sintered metal filter. Filter FF3 prevents contaminants from entering both the fixture and the device under test when no positive pressure exists in line 520. Thus a test operator may dump gas from portions of laser panel 201 by opening valve PV6, and then opening any appropriate combination of valves PV1–PV3 necessary to drain gas pressure. In addition, an operator may dump gas from nitrogen panel 205 by opening valves PV3, PV11, and PV13. Furthermore, by then opening valve PV5 an operator may drain gas from valve manifold 532. Gas may be dumped from pump/halogen panel 203 by opening valve PV8.

When a purge gas source is connected to connector V2, the test operator may direct purge gas throughout laser gas panel 201 and pump/halogen scrubber panel 203. This act allows flushing any contaminants and evaporating any moisture from the high purity gas manifolds of the device under test. Manifold flushing is accomplished by sequentially operating all valves in laser gas panel 201, the valves and pump in pump/halogen scrubber panel 203, and valves PV1–3, PV9, and PV10.

Referring to the upper left corner of FIG. 5A, a 2.5 liter chamber 526 is shown. Chamber 526 is capable of containing pressurized gas and is used during orifice testing as described above under "General Orifice Test Description." Sensor PT3 measures gas pressure in chamber 526 and produces a signal corresponding to measured pressure. Chamber 526 is connected to manifold 528 via valve PV9. Manifold 528 may then be connected to laser panel 201 fitting BH4. Chamber 526 is also connected to line 520 via valve PV10. This connection provides a way for a test operator to dump gas from chamber 526 through filter FF3 and vent V3 to the outside environment.

Also shown is leak detector 524, connected to manifold 528 via valve PV14. Leak detector 524 comprises an external helium detector and a vacuum pump, as known to those skilled in the art of vacuum technology, and is used during gas module 200 leak testing, described below.

Referring to the upper right corner of FIG. 5B, ballast B1 is shown. Ballast B1 is selected to have a volume of 50–100 ml, and is similar to ballast B2. Sensor PT4 measures ballast B1 gas pressure and produces a signal representing the measured pressure. Ballast B1 is connected to nitrogen panel 205 fitting BH10 via line 530 and shutter mechanism 212, described above. Note that the LEGRIS fitting inherently has some gas leakage around the push-in engagement mechanism for the plastic tubing connecting the LEGRIS with laser shutter 212. The gas volume normally leaked is trivial compared with the gas flow volume to laser shutter 212. A test operator may dump gas from ballast B1 and line 530 by opening valve PV12 and allowing gas to flow through vent V4 to the outside environment. Rotameter ROTA1 measures gas flow as it drains through vent V4. A test operator may observe rotameter ROTA1 gas flow to make final adjustment to gas flow through orifice OR6 to be approximately correct for laser shutter operation when a gas module (gas module 200, FIG. 2, for example) is initially installed in a laser (laser system 101, FIG. 1, for example).

Also shown is pressure sensor PTX. Sensor PTX measures barometric pressure of the outside environment and produces a signal representing the measured pressure. The test operator may use this signal to precalibrate all other sensor/transducer readings during gas module 200 test procedures.

Finally, referring to the lower right corner of FIG. 5A, manifold 513 is shown connected to gas module 200 fitting BH6. Gas in manifold 513 may vent to the outside environment through check valve FCV2, which in this embodiment is a high flow, ball-type check valve with an opening pressure rating of approximately one-third ($\frac{1}{3}$) psi, through filter FF2 which is an off-the-shelf sintered metal filter, similar to filter FF1, having a flow rating sufficient so as to cause no flow restriction, and through vent V5. Vacuum sensor VS1 measures gas pressures in manifold 513 that are below approximately one (1) atmosphere and produces a signal representing the measured pressure. In the embodiment shown, sensor VS1 is an OMEGA model PX542. A test operator may protect sensor VS1 from damaging gas overpressure by closing valve PV16.

Figure 6:
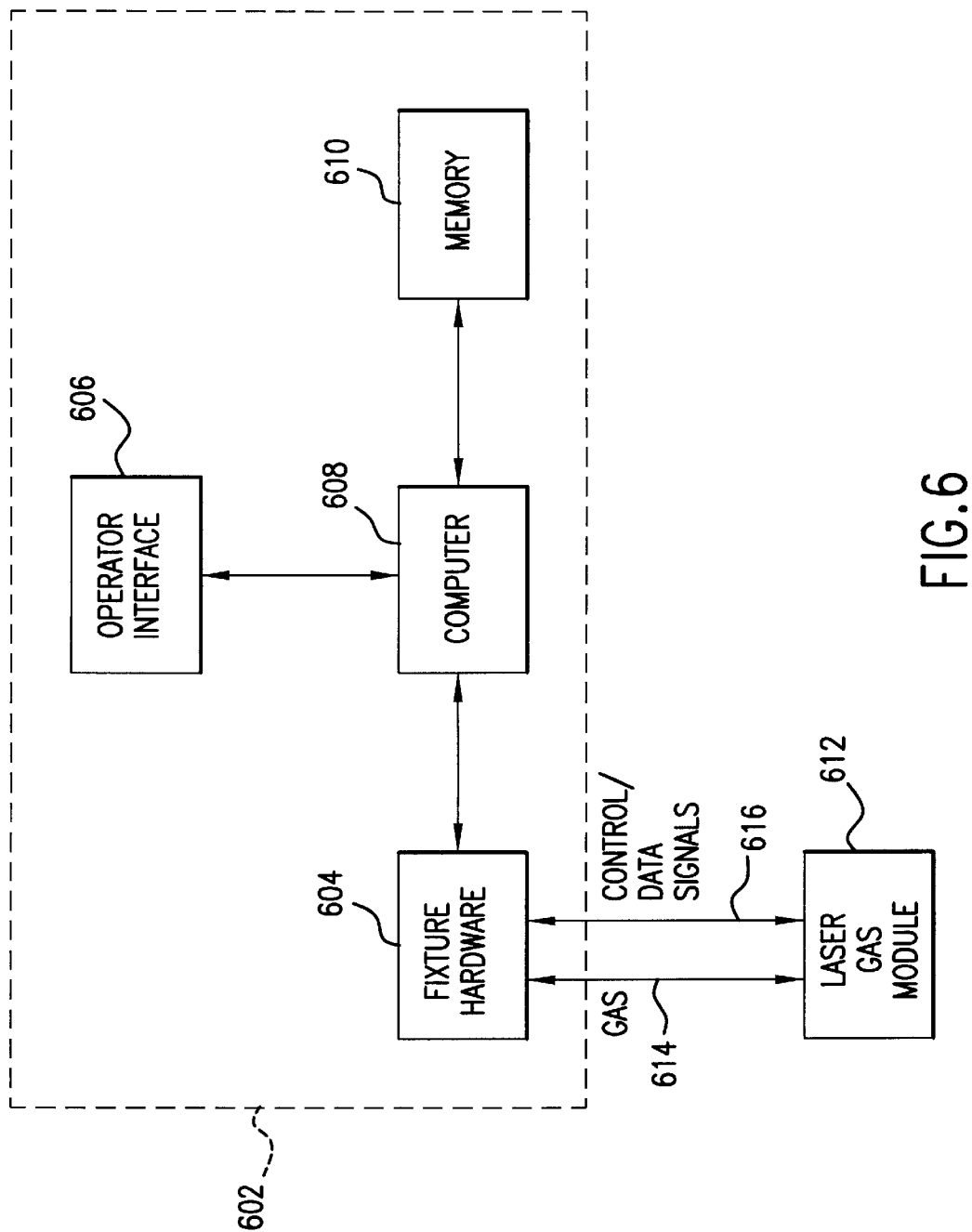
FIG. 6 is a block diagram showing an embodiment of the present invention.

FIG. 6 is a block diagram showing an embodiment of the invention. Test fixture 602 is shown connected so that both pressurized gas 614 and electrical control and data signals 616 may travel between fixture hardware 604 and laser gas module 612 under test. For example, gas 614 may comprise gas flowing between test fixture hardware 500 and gas module 200 though fittings BH1–7 and BH10 as shown in FIGS. 5A and 5B. Signals 616, for example, may comprise pressure signals from sensors PS1–3 and actuating signals supplied to valves SV1–11 and pump P1 also shown in FIGS. 5A and 5B. Signals 616 may also comprise calibration signals for sensors PS1–3 and control signals for regulators FR1–3.

Fixture hardware 604 may include both pressurized gas supply apparatus, such as that described above in relation to FIGS. 5A and 5B, and electronic circuits that provide a data acquisition interface between gas module 612 and computer 608. In one embodiment, data acquisition interface circuitry includes conventional interface circuits manufactured by NATIONAL INSTRUMENTS, Inc. In the embodiment shown, all control and measurement signals sent between test fixture 602 and gas module 612 are routed through these installed circuits. Fixture hardware 604 is chosen to be compatible with test sequencing software described below, and to provide data transfer rates appropriate for tests to be performed. Conventional electronics, such as opto-isolator relays to drive solenoid valves, are used for the interface between computer 608 and plumbing components in both test fixture 602 and gas module 612. In other embodiments, other interface circuit configurations may be used. A memory 610 for storing information is shown connected to computer 608. Information stored in memory 610 may include one or more necessary computer programs and results of test procedures conducted in accordance with this invention. As depicted, memory 610 may be any electronic or magnetic data storage device capable of being connected to an electronic computing network. In other embodiments memory 610 may include printouts or written records of test results.

In the embodiment shown, test fixture 602 hosts all test program, data management, user interface, and network interconnection needs. In one embodiment computer 608 is an IBM-compatible personal computer configured with MICROSOFT WINDOWS NT and MICROSOFT NETWORK. In other embodiments computer 608 may be configured with any conventional operating system and/or networking program. Operator interface 606 is connected to computer 608 so that an operator may issue commands to, and receive information from, computer 608. Interface 606 may include a visual display, a keyboard, and/or a mouse or other pointing device.

In one embodiment computer 608 is configured to operate with programs written in LABVIEW, a programming language provided by NATIONAL INSTRUMENTS, Inc., to provide a graphical operator interface display on interface 606. A particular benefit of this control embodiment is the developed software's graphical interface. LABVIEW allows graphical display and control of gas plumbing components in both gas module 612 under test and test fixture 602. Thus, test fixture 602 may be adapted to test a particular laser gas module 612.

The software is configured to automatically execute complex test sequences with minimal test operator intervention. Tasks may include setting gas regulator pressures (via digitally controlled regulator devices), calibrating and adjusting sensors and transducers, actuating valves in precise sequences, acquiring data, and recording all test conditions and results.

Individual tests may consist of an action sequence to carry out embodiments of the general test methods described above as well as other tests described below. The software may be configured to execute a particular sequence comprising a single test, a group of tests, and a repetition of any single test or group of tests.

In addition, in this embodiment the test software provides indications for manual operation of all controlled devices (valves, regulators, etc.) and direct reading of all data signals. All device control and data signals may be handled through a computer-controlled user interface 606. Thus a test operator may be required to abandon user interface 606 only to operate manual valves and regulators or to read mechanical indicators.

The test fixture user interface 606 is designed to graphically represent the actual schematic design of the gas module, the test fixture, and the interconnections between the gas module and the test fixture. This representation includes all tubing, valves, regulators, sensors and transducers, orifices, check and overpressure valves, external connectors, chambers, needle valves, filters, pumps, and all other fluid processing devices and connections that are part of the gas module or the fixture.

All data source devices that produce data signals (i.e., devices other than strictly mechanical gauges) may be represented on the computer interface 606 screen. For example, in one embodiment the fixture continuously displays real-time data values from pressure transducers. Data may be updated and displayed both during and apart from test operations. Thus, monitoring device calibration, such as pressure sensor calibration, is facilitated during test fixture idle time.

User interface 606 may continuously display a data graph. The display may also include an associated menu containing a list of all of data sources shown on the graphical device schematics. The test operator may select any one or combination of listed data sources and their real-time values will be continuously added to the running, time-based graph. The data graph may be started and stopped via a virtual button on the interface 606 screen to permit data gathering and graphing during a chosen period. An automatic test sequence program statement may also start and stop the data graphing operation.

The data graph display may further incorporate a system of cursors and data point readout aids which assist data analysis when the graphing function is stopped. The data graph display may incorporate provisions for saving the collected and displayed data to a memory 610. For example, in one embodiment, saving data creates a text file representation of all floating point data, with each data source represented in a separate column. A time interval column is automatically generated parallel to the data points, and the file has a prepended header that identifies the reference designator of a device which generated each column of data points, along with test time and initial condition information.

All user interface-controllable device states may be displayed using color and shape changes on the displayed interface 606 schematic representation. This device state display provides a clear and instant visual representation of open fluid paths. In one embodiment, the fixture continuously updates and displays all software-controlled device states on user interface 606 regardless of manual or automatic test sequence mode operation.

During automatic test sequences, computer 608 may collect all test data and saves them in memory 610. Data stored may include operator identification, test fixture identification, test software identification and version information, gas module 612 part and revision numbers, gas module 612 serial number, initial ambient conditions, test start/stop time stamps, pass/fail data by sequence ID or parameter, and analog data for critical measurement parameters. Memory 610 may be a human readable text-based dump, or may be a data base.

D. Test Description

Preparation for Gas Module Testing

Referring again to FIGS. 5A and 5B, testing may begin by connecting test fixture 500 to gas module 200 and laser chamber 208 at all bulkhead fittings (BHs), and electrical connections (not shown) for sending and receiving control and data signals, appropriate for the test(s) to be conducted. The connections are conventional and allow gas and both sensor and control signals to pass among test fixture 500, gas module 200, and laser components such as shutter 212. Fixture BH6 may be initially capped and sealed in a conventional manner, may be opened, or may have additional test equipment attached if required as necessary as described below. In some test sequence embodiments, shunt 210 is manually inserted.

For initial set-up, an operator may close all solenoid valves, manually close valves MV1–4 in nitrogen panel 205, and manually open valve SO1 in laser gas panel 201. An operator may then set regulators FR1, FR2, and FR3 to govern gas pressures as desired (95, 140, and 50 psi, respectively, for example). An operator may manually close orifice OR6. And, an operator may set a needle valve NV1 opening so as to adjust gas entering ballast B2 to produce a desired fill rate.

Nitrogen panel 205 components are typically tested first because nitrogen gas drives other gas module components. After a test operator tests nitrogen panel 205 components he may test the remaining gas module 200 components.

Rather than describe a complete test sequence, which may be varied as a test operator requires, the remaining discussion is organized topically by test function. Those skilled in the art will understand that specific test sequences described represent one or more embodiments of the invention. Many test sequence variations exist in accordance with the present invention for both operational and development testing of a gas module.

Valve Logic Test

A test operator may test valve logic to ensure that the correct pressure actuated valve opens when a control signal is applied to its corresponding solenoid valve. The operator may manipulate test fixture 500 valves so as to apply pressurized gas to a closed pneumatic-actuated valve in gas module 200. Then the operator supplies an opening signal to the corresponding solenoid valve and monitors an appropriate pressure sensor for a pressure increase downstream of the valve under test.

For example, an operator may test laser gas panel 201 valve PAV1 by opening valves PV4 and PV1 and applying an activation signal to solenoid valve SV1. If pressure rises on sensor PS1, valve PAV1 has opened. Other pneumatic valves may be similarly tested.

An operator may also test proper valve activation by monitoring for a pressure drop after sending an opening signal to a valve under test. As shown in this embodiment, an operator may test laser gas panel 201 solenoid valves SV9, SV10, and SV11 by pressurizing manifold 216 and monitoring sensor PS2. When valve SV9, SV10, or SV11 receives an opening signal, sensor PS2 senses the manifold 216 gas pressure drop as gas flows out through fitting BH5 or BH6 as applicable.

Check and Relief Valve Tests

Using the embodiment shown, a test operator may conduct tests of check and relief valve opening pressures in a manner similar to that described above under "General Check Valve Test Description." Needle valve NV1 and ballast B2 function in a way similar to that described for valve 306 and ballast 308 in the description accompanying FIG. 3A, above. In the embodiment shown in FIGS. 5A and 5B, ballast B2 is a known volume canister in the range of 50–100 milliliters. Valve NV1 is adjusted to provide a small gas flow causing a desired rising gas pressure ramp in ballast B2. In one test sequence embodiment, ramp rates used were approximately 3–4 seconds. This time was ample for sampling and to allow transducer settling (typically on the order of 10 milliseconds for the devices used herein).

To test valve CV3, for example, a test operator may begin by opening all valves downstream of valves PV13 and PV7 and removing gas pressure from manifold 202 and fittings BH1, BH2, and BH3, and then closing all valves. The operator then opens valve PV3 to allow sensor PT2 to monitor ballast B2 gas pressure upstream of valve CV3 under test, and opens valve PAV3 to allow sensor PS1 to monitor manifold 202 gas pressure below valve CV3. The operator opens valve PV11 to route gas from ballast B2 to valve CV3.

To conduct the test, the tester opens valve PV7. A gas pressure ramp builds in ballast B2, measured by transducer PT2. Sensor PS1 indicates when valve CV3 opens. The peak reading from PT2 will indicate the actual maximum opening pressure of CV3. The test operator may then close PV11 and open PV6 to vent positive pressure in manifold 516 while manifold 202 remains pressurized from the previous actions. The test operator may then verify that CV3 has once again closed, and may measure CV3's leakage by monitoring PS1's output signal. Referring to FIG. 6, computer 608 receives signals from transducers PT2 and PS1 (FIG. 5A) through fixture hardware 604, determines opening pressure against time with difference calculations, stores the result in memory 610, and produces a display on interface 606.

Referring again to FIGS. 5A and 5B, check valves CV1 and CV2 may be tested in a way similar to that used for valve CV3 as described above. To test valves CV1 and CV2, however, the tester opens valves PV1 and PV2 as required to route gas to the check valve under test, and opens valves PAV1 and PAV2 to allow sensor PS1 to measure pressure below the check valve under test.

Check valve CV4 may be similarly tested. Check valve CV4, having a significant specified opening pressure as described above, is more likely to stick. Valve PV4 is closed to remove normal operating input pressure. Valve SV10 is opened to remove back pressure from valve CV4 (fitting BH6 is uncapped). Valves PV11 and PAV3 are opened, and then valve PV7 is opened to apply a high pressure ramp to valve CV4 through ballast B2. Sensor PS1 monitors the increasing pressure ramp and sensor PS2 monitors pressure below valve CV4. As described above, the resulting pressure differential indicates valve CV4 opening pressure.

Valves CV5 and CV6 are tested similarly, except the tester monitors only upstream pressure because the valves vent to the outside environment. Outside pressure may be supplied by transducer PTX or other indicator. When the tester opens valve PV8, for example, valve CV5 vents through filter FF3. Valve CV6 vents through fitting V1. Shunt 210 is inserted. Gas is routed to valve CV5 by opening valves PV11, PAV3, and PAV4. Gas is routed to valve CV6 using valve PV13. During the test, sensor PS2 measures valve CV5 upstream pressure and transducer PT1 measures valve CV6 upstream pressure.

Valve CV7 may be tested by closing needle valve OR6, pressurizing manifold 214, opening solenoid valve SV7, and observing a slow pressure rise indicated by a transducer PT4 output signal. A slow pressure rise is normally observed because needle valve OR6 may not close to a full seal.

Leak Testing

A typical gas module has an extremely small leak tolerance. Still referring to FIGS. 5A and 5B, a test operator may use the embodiment shown to conduct a conventional helium leak detection test of laser gas panel 201. An operator may isolate laser gas panel 201 by closing valves or capping fittings BH1–BH3, BH5, and BH6 as appropriate, and by closing valve PV9. The operator may then open all laser gas panel 201 internal valves. The test operator then activates leak detector 524, which creates a vacuum pressure, and opens valve PV14. The gas module pressure transducers are selected from standard components to accommodate a pressure range including zero psia. The test operator may then manually apply a small helium stream to all gas fittings and plumbing using a hand-held nozzle. If a leak exists, a vacuum pump in leak detector 524 draws the applied helium through the leak opening. Leak detector 524 then detects the helium and produces an output signal received by computer 608 via fixture hardware 604 (FIG. 6). Note that although a leak test of a nitrogen panel may be performed, solenoid valves typically have some leakage and the expense of any normally leaked nitrogen gas is trivial. Test procedures concentrate on components accommodating gas comprising fluorine.

In addition to using a conventional helium leak test, a test operator may measure leakage using a volume transfer method. The approximate gas module and test fixture plumbing volumes may be measured or calculated. The test operator then pressurizes the appropriate plumbing and monitors an appropriate pressure sensor. Any pressure rise or decrease at a specified location indicates a leak, and the leak rate may be calculated using known gas laws.

For example, valves PAV1–PAV3 may be leak tested by applying gas pressure to their inputs through fittings BH1–BH3, respectively, and using sensor PS1 to monitor for any output pressure rise. A lack of pressure rise in manifold 202 shows that no "forward" pressure leak exists for the valve under test. Forward pressure as used here means pressure applied as the result of gas flowing in the direction normally used during laser operation. Then, manifold 202 may be pressurized, valves PAV1–6 are closed, and the test operator monitors sensor PS1 for any pressure drop. A pressure drop indicates that one of the valves has "reverse" pressure leak. Reverse pressure as used here means pressure applied as the result of gas flowing in the direction opposite the direction normally used during laser operation. An operator may leak test remaining gas module 200 and test fixture 500 components using a similar volumetric approach.

Check valves may be "reverse" leak tested by pressurizing the line downstream of the valve under test, removing the supply upstream of the valve under test, and monitoring for pressure decrease. For example, valves CV1, CV2, and CV3 may be checked by pressurizing manifold 202 by opening valves PV1–PV3, and then opening and subsequently closing valve PV4. The operator then opens valve PV6 to provide a gas route through vent V3. If sensor PS1 output detects any leak, the operator may isolate the leaking check valve by repressurizing and manipulating valves PV1, PV2, and PV3 in turn.

Orifice Testing

The operator may carry out orifice testing using an embodiment of the invention shown in FIGS. 5A and 5B, as described above under "General Orifice Test Description." As shown, a 2.5 liter chamber 526 is used as a known volume tank (416, FIG. 4) because an actual laser chamber 208 has a much greater volume. Using the smaller chamber 526 shortens fill time and saves expensive gas.

To test orifice OR3 for example, a test operator opens valve PV10 and allows chamber 506 pressure to stabilize at outside environment pressure. Then the operator stabilizes manifold 202 at chamber 526 pressure by opening valve PV9 and valve PAV5. When chamber 526 and manifold 202 pressures stabilize, the operator closes valve PV10 and applies a desired gas pressure to fitting BH3 by manipulating appropriate test fixture 500 valves. The test begins when operator opens valve PAV3. Orifice OR3 controls chamber 526 fill rate as monitored by sensor PT3. Using procedures as described above in relation to FIG. 4, a computer 608 (FIG. 6) may calculate orifice OR3 average diameter by receiving data signals used to show chamber 526's fill rate over time. A test operator may test orifices OR1, OR2, and OR4 using this method by manipulating the necessary gas module 200 valves.

A test operator may test orifice OR5 using another embodiment of the method for orifice testing as described above under "General Orifice Test Description." The test operator may pressurize chamber 526 and then close valve PV9, thereby holding a high gas pressure in chamber 526. The test operator then opens valve SO1 and monitors transducer PT3 pressure output signal. To begin the test, the test operator opens valves SV10 and PV9 so that chamber 526 pressure drains to the outside environment through orifice OR5. Once again a computer 608 (FIG. 6) may calculate orifice OR5 average diameter using the pressure decrease rate and known system restrictions, and referencing calibration data as described in detail above.

Opening chamber 526 to the atmosphere may introduce water vapor to the system. Test embodiments as described herein, however, were designed to be performed in a clean room environment with controlled humidity. The hot purge gas inlet V2 at PV15 allows the device under test to be dried out with heated nitrogen before the device under test is sealed and sent to WIP stores or to an operating laser system.

Nitrogen panel 205's adjustable needle valve OR6 average opening diameter may be tested using the same method as for testing orifice OR5. A test operator may stabilize ballast B1 gas pressure by opening valve PV12. The test operator then directs pressurized gas to fill ballast B1 by pressurizing manifold 214 and opening valve SV7. Gas then begins to fill ballast B1 by flowing through needle valve OR6. Sensor PT4 monitors ballast B1 pressure increase and thus valve OR6 average opening diameter may be determined. A test operator may also use this test sequence valve setting to provide leak information and an initial setting for needle valve OR6.

For a laser system 101 (FIG. 1) operation a laser system operator must set an average orifice diameter for needle valve OR6 to provide a required gas flow amount to properly actuate laser system shutter 212. In the embodiment shown, an operator may do this by pressurizing manifold 214, opening valves SV7 and PV12, and manually adjusting valve OR6 to obtain the desired flow as indicated by rotameter ROTA1.

Pump Testing

In the embodiment shown, pressure transducers in test fixture 500 and gas module 200 are silicon strain-gauge positive pressure transducers selected to withstand low pressures caused by pump P1. Their calibration does not provide adequate resolution at very low pressures. Sensor VS1, however, is a low-pressure transducer that is appropriate for measuring the vacuum pump pressures developed by pump P1.

For pump P1 testing, valves PV8–10, PV16, PAV4–5, and SV9–11 are opened to allow manifold 216 and chamber to attain ambient pressure. Then, all valves except SV10 and PV16 are closed. In one embodiment, software is configured to protect sensor VS1 by preventing valve PV16 from opening if a sensor PS2 output signal indicates a pressure significantly above ambient pressure. Valves SV9 and SV11 are opened to ensure that pump P1 does not start against a pressure head.

To begin the test, valves PV8–9, PAV4–5, and SV11 are opened and pump P1 is started. Valve PV8 provides a pump outflow path via line 518. Pump P1 operation is acceptable if a sensor VS1 output signal has a specified maximum pressure reading after a specified run time.

While the present invention has been described in terms of specific embodiments, those skilled in the art will appreciate that many modifications and variations exist that fall within the spirit and scope of the present invention.

We claim:

1. A gas module orifice test fixture comprising:

a tank having an inlet port, said tank being capable of holding a quantity of pressurized gas;

a pressure regulated gas source connected using a gas line to said inlet port;

an orifice under test positioned in said gas line between said gas source and said tank such that gas flowing in said gas line must pass through said orifice under test; and a pressure sensor positioned to sense gas pressure in said gas line on a first side of said orifice under test, said pressure sensor producing a first pressure signal.

2. The apparatus of claim 1 further comprising a calculator electrically coupled to receive said first pressure signal, wherein said calculator is adapted to use said first pressure signal to calculate said orifice under test's average diameter.

3. The apparatus of claim 2 wherein said calculator comprises a visual display of elements of said test fixture, and allows control of selected said components of said test fixture with a pointing device.

4. The apparatus of claim 1 wherein said first pressure signal comprises a digitally sampled signal of a predetermined sampling rate.

5. The apparatus of claim 1 further comprising:

a second pressure sensor connected to measure gas pressure in said gas line on a side of said orifice under test opposite said first side, said second pressure sensor producing a second pressure signal; and a calculator electrically coupled to receive said first and said second pressure signals;

wherein said calculator uses said first and said second pressure signals to calculate said orifice under test's average diameter.

6. A method of determining gas flow restricting orifice average diameter comprising:

directing a gas flow through said gas flow restricting orifice so as to pressurize a container;

producing a data signal by measuring increasing gas pressure in said container as said gas flow enters said chamber;

calculating an average diameter of said gas flow restricting orifice by using said data signal.

7. The method of claim 6 wherein said calculating comprises comparing increasing pressure information derived from said data signal to increasing pressure information when said container is pressurized through a second gas flow restricting orifice of known average diameter.

8. The method of claim 7 further comprising:

providing a visual display of elements of a test fixture; and controlling operation of selected of said elements of said test fixture by using a pointing device on said visual display.

* * * * *